United States Patent
Kos

(10) Patent No.: US 10,806,155 B2
(45) Date of Patent: Oct. 20, 2020

(54) EGG FLAVOURING PROCESS

(71) Applicant: KOSSIES INNOVATIONS PTY LTD, Stonehaven (AU)

(72) Inventor: Julie Ann Kos, Stonehaven (AU)

(73) Assignee: Kossies Innovations Pty Ltd, Stonehaven (AU)

( * ) Notice: Subject to any disclaimer, the term of this patent is extended or adjusted under 35 U.S.C. 154(b) by 0 days.

(21) Appl. No.: 16/331,724

(22) PCT Filed: Sep. 8, 2017

(86) PCT No.: PCT/AU2017/050978
  § 371 (c)(1),
  (2) Date: Mar. 8, 2019

(87) PCT Pub. No.: WO2018/045428
  PCT Pub. Date: Mar. 15, 2018

(65) Prior Publication Data
  US 2019/0200629 A1  Jul. 4, 2019

(30) Foreign Application Priority Data

Sep. 9, 2016 (AU) .............................. 2016903631
  May 23, 2017 (AU) .............................. 2017901958

(51) Int. Cl.
  *A23B 5/10*   (2006.01)
  *A23L 15/00*  (2016.01)
  *A23B 5/00*   (2006.01)

(52) U.S. Cl.
  CPC ................. *A23B 5/10* (2013.01); *A23B 5/00* (2013.01); *A23L 15/30* (2016.08); *A23V 2002/00* (2013.01)

(58) Field of Classification Search
  CPC . A23L 15/30; A23L 15/00; A23B 5/00; A23B 5/10; A23B 4/052; A23B 4/044
  See application file for complete search history.

(56) References Cited

U.S. PATENT DOCUMENTS

| | | | |
|---|---|---|---|
| 3,009,818 A | 11/1961 | Jokay | |
| 4,565,122 A | 1/1986 | Feuillalay | |
| 5,484,619 A | 1/1996 | Yamaoka | |
| 5,972,401 A | 10/1999 | Kowalski | |
| 6,168,822 B1 | 1/2001 | Reicks | |
| 7,476,410 B2 | 1/2009 | Singh | |
| 7,833,557 B2 | 11/2010 | Kuwa | |
| 8,815,320 B2 | 8/2014 | Buxmann | |
| 9,974,820 B2 | 5/2018 | Ablett | |
| 10,045,546 B2 | 8/2018 | Giebel | |
| 2007/0148316 A1 | 6/2007 | Lee | |
| 2008/0072770 A1 | 3/2008 | Chiu | |
| 2009/0136638 A1 | 5/2009 | Fujie | |
| 2012/0003368 A1 | 1/2012 | Lee | |
| 2015/0296816 A1 | 10/2015 | Fisher | |
| 2017/0215442 A1 | 8/2017 | Buxmann | |

FOREIGN PATENT DOCUMENTS

| | | |
|---|---|---|
| CN | 1596746 | 3/2005 |
| CN | 1911105 | 2/2007 |
| CN | 107526255 | 7/2012 |
| CN | 102669726 | 9/2012 |
| CN | 103202492 | 7/2013 |
| CN | 102835683 | 4/2014 |
| CN | 105212097 | 1/2016 |
| CN | 106261053 | 1/2017 |
| CN | 108077791 | 5/2018 |
| CN | 108208626 | 8/2018 |
| DE | 20205240 | 6/2002 |
| EP | 3342291 | 7/2018 |
| JP | 6251946 | 3/1987 |
| JP | S63214138 | 9/1988 |
| JP | 147891 | 6/1995 |
| JP | 09294567 | 11/1997 |
| JP | 2872037 | 3/1999 |
| JP | 2000166462 | 6/2000 |
| JP | 2000236807 | 9/2000 |
| JP | 2003265145 | 9/2003 |
| JP | 2006230292 | 9/2006 |
| JP | 2007037486 | 2/2007 |
| JP | 4148058 | 9/2008 |
| JP | 2008228700 | 10/2008 |
| KR | 200181551 | 5/2000 |
| KR | 2010073241 | 8/2001 |
| KR | 100308644 | 9/2001 |
| KR | 100372024 | 2/2003 |
| KR | 100397666 | 9/2003 |
| KR | 100521105 | 10/2005 |
| KR | 20050105704 | 11/2005 |
| KR | 100548024 | 2/2006 |

(Continued)

OTHER PUBLICATIONS

NZ Manuka Egg Company, waveback machine screen shot website page, Aug. 10, 2010. (Year: 2010).*
Nom Nom Panda, Aug. 3, 2011 (Year: 2011).*
KR 2005042603 A,, Won-Gi Hong, May 10, 2005, Machine Translation. (Year: 2005).*
Livingston, A.D. Cold-Smoking & Salt-Curing Meat, Fish & Game, Lyons Press, Oct. 5, 2010. pp. 111 (Year: 2010).*
The NZ Manuka Egg Company—Suppliers of Manuka Smoked Eggs and Manuka Smoke Concentrate, https://nzmanukaeggs.co.nz, download date May 29, 2019.
Notification of Material Filed by a Third Party; 15 pages; May 10, 2019; IP Australia.
Hey Grill Hey—How to make smoked eggs https://heygrillhey.com; 18 pages; download date Sep. 7, 2018.
Smoked Eggs https://yodersmokers.com/wp-content/uploads/2016/05/smokedeggscompressed.pdf; 3 pages.

(Continued)

*Primary Examiner* — Hong T Yoo
(74) *Attorney, Agent, or Firm* — Jeffrey A. Proehl; Woods, Fuller, Shulz & Smith, PC

(57) ABSTRACT

The invention relates generally to a process for flavouring raw eggs and egg components using smoke and to smoked raw eggs and egg components prepared by the process. In particular, the invention relates to a cold smoking process for imparting flavour to raw eggs or raw egg components.

22 Claims, No Drawings

(56) References Cited

FOREIGN PATENT DOCUMENTS

| | | |
|---|---|---|
| KR | 100554017 | 2/2006 |
| KR | 100607552 | 8/2006 |
| KR | 100734518 | 7/2007 |
| KR | 20080025486 | 3/2008 |
| KR | 20100041527 | 4/2010 |
| KR | 100962178 | 6/2010 |
| KR | 101090331 | 12/2011 |
| KR | 20120058003 | 6/2012 |
| KR | 20120095669 | 8/2012 |
| KR | 20130092297 | 8/2013 |
| KR | 20140020102 | 2/2014 |
| KR | 101442725 | 9/2014 |
| KR | 20150036850 | 4/2015 |
| KR | 101661692 | 9/2016 |
| KR | 20170058109 | 5/2017 |
| KR | 101777274 | 9/2017 |
| KR | 20170140037 | 12/2017 |
| KR | 101852341 | 4/2018 |
| KR | 101842881 | 5/2018 |
| RU | 2309599 | 11/2007 |
| RU | 2309600 | 11/2007 |
| RU | 2330521 | 8/2008 |
| WO | 9927794 | 6/1999 |
| WO | 2017131256 | 8/2017 |
| WO | 201880211 | 5/2018 |
| WO | 2017033388 | 6/2018 |

OTHER PUBLICATIONS

Genius Kitchen: Cold Smoked Eggs. Recipe by Chefro https://www.geniuskitchen.com/recipe/cold-smoked-eggs-443717; 2 pages; download date Sep. 7, 2018.

Barbecook. Toast with cold smoked eggs Nov. 13, 2017 https://www.barbecook.com/en/grillspiration/recipes/toast-cold-smoked-eggs/; 7 pages; download date Sep. 7, 2018.

Your Grocer: Cold Smoked Eggs (raw) https://www.yourgrocer.com.au/info/retailers/marias-pasta/products/cold-smoked-eggs-raw-half-dozen-yg-map-233; 4 pages; download date Sep. 7, 2018.

Outdoor Feeds: Smoked Eggs: Four Delicious Ways with Smoked Eggs https://outdoorfeeds.com/smoked-eggs/#Cold_Smoked_Eggs; 8 pages; download date Sep. 7, 2018.

Transcript of the video clip entitled "NZ Manuka Eggs" available at https://vimeo.com/17312457, accessed on Sep. 26, 2019.

Mintel; Aug. 25, 2015 (Aug. 25, 2015), anonymous: "Smoked Free Range Eggs", XP055652563, retrieved from www.gnpd.com; Database accession No. 3378581.

Anonymous: "Food Heroes: NZ Manuka Egg Company—Otago", Jul. 7, 2010 (Jul. 7, 2010), XP055652561, Retrieved from the Internet: URL:http://nzfoodheroes.blogspot.com/2010/07/nz-manuka-egg- com pany-otago. htm l [retrieved on Dec. 12, 2019].

\* cited by examiner

EGG FLAVOURING PROCESS

TECHNICAL FIELD

The invention relates generally to a process for flavouring raw eggs and egg components using smoke and to smoked raw eggs and egg components prepared by the process. In particular, the invention relates to a cold smoking process for imparting flavour to raw avian eggs or raw avian egg components.

BACKGROUND

Birds' eggs, in particular, chicken eggs, are a popular and versatile food that is widely used in the food industry. In the food industry, eggs can be incorporated in a large number of food products and recipes and can be cooked in a variety of different ways.

Uncooked (raw) eggs generally have a transparent egg white surrounding a yolk. The egg white is generally a transparent liquid composed primarily of water, into which are dissolved proteins such as albumins, mucoproteins, and globulins, and some carbohydrates. Unlike the yolk, the egg white contains almost no fat. In comparison, the egg yolk is rich in fat as well as protein, and holds many of the vitamins (including fat soluble vitamins) and minerals of the egg.

When it is desired to impart a flavour to eggs, ingredients including herbs, spices and seasonings are often added to eggs, either before or after the eggs are cooked. Additionally, eggs may be steeped in a liquid, such as a marinade or pickling liquid, in order to be imparted with flavour.

Smoking is a technique that has been used to flavour fish and meat products. However, in addition to imparting flavour, smoking can also provide the ability to preserve and/or cook the foodstuff. Consequently, there exists the potential that smoking can alter the appearance and properties of a foodstuff.

It would be desirable to provide a process that enables a raw egg to be imbued with smoke flavour without adversely affecting the physical properties of the raw egg.

It would further be desirable to provide a process that enables raw egg contained in an egg shell to be imbued with smoke flavour without adversely affecting the physical properties of the raw egg.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

SUMMARY OF THE INVENTION

Broadly, the present invention provides a process for cold smoking raw (uncooked) egg to impart a smoke flavour to the raw egg. The process is used in particular to impart a smoke flavour to raw avian (bird) eggs.

In one aspect, there is provided a process for preparing smoked raw avian egg comprising the step of cold smoking raw avian egg under conditions sufficient to impart smoke flavour without cooking the raw egg.

The cold smoking may be performed at a temperature and for a time period sufficient to impart a desired smoke flavour without cooking the raw egg. In some embodiments, cold smoking of the raw egg is performed under refrigerated conditions.

In one embodiment of the process of the invention, raw avian egg is exposed to smoke while under refrigerated conditions in order to impart smoke flavour to the raw egg. The smoking process described herein may therefore be regarded as a cold smoking process that is performed under low temperature conditions.

Thus in a particular aspect, there is provided a process for preparing smoked raw avian egg comprising the step of cold smoking raw avian egg under refrigerated conditions, the conditions being sufficient to impart smoke flavour without cooking the raw egg.

In one set of embodiments, the cold smoking step is performed at a temperature of no more than about 25° C., or no more than about 20° C.

In other embodiments, the cold smoking step is performed at a temperature of no more than about 10° C., no more than about 7° C., or no more than about 5° C. In particular embodiments, the cold smoking step is performed at a temperature in a range of from about 2° C. to about 10° C., preferably in a range of from about 2° C. to about 5° C.

The cold smoking step may be performed for a desired time period. The desired time period can range from a minutes to several hours, and may be dependent on the temperature at which the cold smoking step is performed, the form of the raw egg to be smoked (i.e. whether it is raw egg in liquid form or shell form), the volume or quantity of raw egg being smoked, and the intensity of smoke flavour desired, amongst other factors.

In some embodiments, cold smoking may be performed for a time period of at least 1 hour. In some embodiments, cold smoking may be performed for a time period of from about 1 to 2 hours. In one exemplary embodiment, cold smoking may be performed for a time period of about 70 minutes. Such time periods may be suitable when the cold smoking step is performed at an ambient room temperature, such as a temperature of about 20° C.

In other embodiments, the cold smoking step may be performed for a time period of at least 30 minutes or at least 1 hour. In some embodiments, cold smoking may be performed for a time period of from about 1 to 72 hours, or from about 12 to 48 hours, or less than 24 hours. In one exemplary embodiment, cold smoking may be performed for a time period of about 16 hours. Such time periods may be suitable when the cold smoking step is performed at a refrigerated temperature of no more than about 10° C.

In another specific embodiment, cold smoking of the raw egg is performed at a temperature in a range of from about 2° C. to about 5° C. for a time period of from about 1 to about 72 hours.

In another aspect, there is provided a process for preparing smoked raw egg contained in an egg shell comprising the step of cold smoking raw shell egg under refrigerated conditions, the conditions being sufficient to impart smoke flavour to the raw egg in the shell without cooking the raw egg.

In embodiments of the above aspect, the raw shell egg is subjected to cold smoking at a temperature of no more than about 10° C., preferably on more than about 5° C., for a time period of at least 10 hours, or from about 12 to 48 hours.

In a particular embodiment of the above aspect, the raw shell egg is subjected to cold smoking at a temperature in a range of from about 2° C. to about 5° C. for a time period of about 16 hours.

In another aspect there is provided smoked raw egg prepared by the process of any one of the embodiments described herein. The smoked raw egg may be in liquid form or shell form. In a particular embodiment, the smoked raw egg is smoked raw shell egg.

In another aspect there is provided a packaged product comprising the smoked raw egg of embodiments described herein enclosed in a package.

DETAILED DESCRIPTION OF THE INVENTION

As used herein, the singular forms "a", "an", and "the" designate both the singular and the plural, unless expressly stated to designate the singular only.

The present invention is based on the finding that a pleasing smoke flavour can be imparted to raw, uncooked egg using a cold smoking process. The smoking process described herein can enable raw egg to be imbued with the smoke flavour without cooking the egg. Accordingly, the smoked raw egg may be used in recipes and the preparation of a range of foodstuffs in much the same way as normal, conventional raw egg. However, since smoked raw egg prepared in accordance with the process described herein has a smoke flavour, the smoke flavour is also imparted to foodstuffs that are prepared with the smoked raw egg.

The process of the invention is particularly useful for imparting a smoke flavour to raw avian (i.e. bird) eggs.

In one aspect of the present invention there is provided a process for preparing smoked raw avian egg comprising the step of cold smoking raw avian egg under conditions sufficient to impart smoke flavour without cooking the raw egg. The cold smoking process may suitably be performed in a smoking chamber.

In one exemplary embodiment of the process, the cold smoking step is performed under refrigerated conditions. Thus the raw egg is exposed to smoke while under refrigerated conditions and is cold smoked while at low temperature.

Accordingly, in one aspect of the present invention there is provided a process for preparing smoked raw avian egg comprising the step of cold smoking raw egg under refrigerated conditions, the conditions being sufficient to impart smoke flavour without cooking the raw avian egg. In accordance with such a process, raw egg is exposed to smoke while under refrigerated conditions.

"Refrigerated conditions" would be understood to be a reference to conditions of low temperature, whereby the temperature is lower than that of ambient room temperature (approximately 20° C.). Generally, a refrigerated condition would refer to a low temperature condition of no more than about 10° C. In one preference, a refrigerated condition refers to a low temperature condition in a range of from about 2° C. to about 5° C.

It is important for the present invention that the low temperature utilised for the refrigerated conditions is not sufficient to result in freezing of any component of the raw egg, such as the egg white and/or egg yolk. This is because freezing can alter the texture and/or structure of the raw egg and thus undesirably impact on the ability of the smoked raw egg to be used conventionally in cooking and recipes in a similar manner as that of normal raw egg. Accordingly, cold smoking of the raw egg under refrigerated conditions is also sufficient to impart a smoke flavour to the raw egg without freezing the raw egg.

The term "raw egg" as used herein is intended to encompass raw egg that is in whole form (i.e. unseparated egg white and egg yolk) as well as in component form (i.e. separated components of egg white or egg yolk). The term is also intended to encompass raw whole egg in which the white and yolk components of the egg have been beaten or stirred together.

Raw whole egg where the white and yolk components have been blended or mixed together may be considered to be in liquid homogenised form and may also be referred to as "homogenised egg".

Additionally, raw egg in component form (as separated egg white or egg yolk components) may also be mixed to form beaten egg white or beaten egg yolk.

The process described herein is applicable for cold smoking raw egg in liquid form. Raw egg in liquid form is unshelled and may be liquid whole egg (i.e. unseparated egg white and yolk) or liquid egg component (i.e. separated egg white or egg yolk). Liquid whole egg and liquid egg component may be beaten or mixed. For example, the process described herein can be applied to liquid homogenised whole egg, where the egg white and yolk are blended together. Thus the term "liquid raw egg" as used herein is intended to encompass all forms and components of unshelled raw egg, including raw whole egg, raw egg component, and homogenised (mixed) raw whole egg or egg component, which are in liquid form.

The process described herein is also applicable for cold smoking raw shell egg in which raw egg in whole, liquid form is contained within an egg shell. Liquid raw egg in an egg shell is considered to be in shell form.

Raw egg contained in a shell is also referred to herein as "raw shell egg".

In one embodiment, the process of the invention is used to prepare cold smoked raw shell egg, where the raw egg is contained within an egg shell. Since the egg shell is porous, smoke can permeate and pass through the shell to flavour the raw egg contained within. Accordingly, the process may be used to cold smoke raw egg in liquid form that is contained within a shell.

In another embodiment, the raw egg may be unshelled, and the process of the invention is used to prepare cold smoked raw egg that is unshelled. That is, the process can be applied to raw egg in liquid form that has been removed from the shell and is not contained in an egg shell.

Raw egg to be smoked in accordance with the process described herein may comprise a raw whole egg or a raw egg component, such as a raw egg white or a raw egg yolk, or combinations thereof. For example, the raw egg may comprise a mixture of raw whole egg and raw egg white or raw egg yolk.

The raw egg may comprise a single raw whole egg or raw egg component, such as a single raw egg white or single raw egg yolk.

Alternatively, the raw egg may comprise a plurality of raw whole eggs and/or raw egg components. For example, the raw egg may comprise a plurality of raw whole eggs, a plurality of raw egg whites and/or a plurality of raw egg yolks.

In some embodiments, the raw egg may comprise a raw mixed whole egg. The raw mixed whole egg may be formed when whole eggs are beaten or stirred, such that the white and yolk components of the egg are mixed or blended together and combined.

The raw egg to be used in the process is preferably obtained from avian (i.e. bird) eggs, in particular, the eggs of domestic fowl such as chickens, ducks, geese, turkey and quail. In a particular embodiment, the raw egg is obtained from chicken eggs.

Cold smoking of the raw egg is generally performed in a smoking chamber and thus raw egg is placed in a smoking chamber in order to carry out the process described herein. The raw egg may be contained in or placed on an appropriate vessel or container for this purpose. There is no particular requirement on the type of vessel to be used, provided that the vessel allows the smoke to come into contact with the egg contained therein. Examples of vessels that may be employed include dishes or trays, such as gastronomical trays.

In some embodiments, individual portions of liquid raw egg may be placed in individual vessels that are suitable for holding the individual portions. Individual portions of liquid raw egg may comprise individual liquid raw whole egg (i.e. unseparated and unmixed egg white and egg yolk), individual liquid raw egg white or egg yolk components, or individual portions of mixed (i.e. homogenised) liquid raw whole egg. The individual portions in the individual vessels may be cold smoked separately, or a plurality of individual portions in vessels may be placed in a smoking chamber for simultaneous treatment by the cold smoking process.

When the raw egg is contained within an egg shell, a person skilled in the relevant art would understand that one or more individual eggs may be placed in or on a vessel suitable for holding the individual eggs for placement in a smoking chamber. In one set of embodiments, raw shell eggs may be placed in a tray having cradles for holding individual shell eggs. The raw shell eggs may be placed point side up or point side down in the cradle.

The smoking chamber in which the raw egg is placed may be part of a smoking device. A suitable smoking device comprises a smoking chamber designed to house the food to be subjected to smoking. Smoking devices can also comprise a combustion chamber in which a heat source or heating elements are arranged. For example, a combustion chamber may comprise a gas or electric burner or a bed of hot coals or embers, which burn flakes (also called chips) of aromatic wood. Fumes produced in the combustion chamber by the burning wood chips can then be conveyed to the smoking chamber and strike the foods contained therein, aromatising them.

The process described herein may be performed in a smoking chamber of any appropriate size and/or configuration. In one set of embodiments, the smoking chamber may be part of a commercially available smoking device. Examples of commercially available smoking devices that may be used to carry out the process described herein include the Rational® Combi steamer with smoker accessory, the Bradley™ smoker, and the Smokai® smoker. However, it would be appreciated that a range of other smoking devices may also be used.

In some specific embodiments, it can be desirable for the cold smoking step to be performed in a smoking chamber having a controlled environment. For example, the cold smoking may be performed in a temperature-controlled environment and/or in a sealed environment.

A temperature-controlled environment may be provided by a smoking chamber equipped with sensors and controls that permit the temperature in the smoking chamber to be monitored and adjusted to maintain a desired temperature during the smoking step.

A sealed environment may be provided by a smoking chamber that is configured to inhibit the ingress or egress of substances from the smoking chamber interior.

In some embodiments, when the raw egg to be smoked is in liquid form, the smoking chamber may comprise a surface that is adapted to receive the liquid raw egg. For example, the smoking chamber may comprise a large, flat surface that may receive the liquid raw egg. The liquid raw egg may coat the surface in the smoking chamber. In this manner, a given volume of liquid raw egg can be thinly spread across a larger surface area, which can provide for enhanced exposure to the smoke in the chamber.

In a particular embodiment, the raw egg is exposed to smoke while in a refrigerated smoking chamber providing a low temperature environment. The raw egg may be in liquid form or in shell form.

In one particular embodiment, the process described herein is performed in a refrigerated smoking chamber that is controlled to maintain a temperature that is less than 10° C., in particular, a temperature in the range of from about 2° C. to 10° C., preferably from about 2° C. to 5° C.

In one set of embodiments, the refrigerated smoking chamber may be a temperature controlled refrigeration unit adapted to contain the raw egg and to also receive and retain smoke therein. The refrigerated smoking chamber may also be in communication with a combustion chamber used to generate the smoke for flavouring the raw egg.

In some embodiments, the cold smoking step is performed in a refrigerated smoking chamber having a temperature controlled and sealed environment. A temperature controlled and sealed environment can enable the raw egg to be cold smoked more evenly and rapidly. Moreover, a sealed environment can also help to inhibit the ingress or egress of substances from the smoking chamber interior and thus limit the possibility of cross-contamination or microbial contamination of the raw egg, thereby facilitating compliance with food safety standards.

After the raw egg is placed in a smoking chamber, the egg is then subjected to a cold smoking step.

In one embodiment of the process described herein, the cold smoking step involves exposing the raw egg to smoke under refrigerated conditions.

In order to perform the cold smoking step, smoke is permitted to enter the smoking chamber containing the raw egg. The smoking chamber may be at a temperature desired for performing the cold smoking step.

In one embodiment, the smoking chamber is a refrigerated smoking chamber. The refrigerated smoking chamber may be at a temperature that is no more than about 10° C. and preferably is at a temperature in the range of from about 2° C. to 5° C.

The smoking chamber may be filled with smoke prior to the raw egg being placed in the smoking chamber. Alternatively, the raw egg may be placed in the smoking chamber, with the smoke then subsequently being introduced into the chamber. Once introduced, the smoke may be permitted to continue to enter the smoking chamber during the cold smoking step in order to flavour the raw egg.

The smoke employed for the cold smoking step may be obtained by combusting a suitable fuel, which generates the smoke. In a particular embodiment, the fuel is wood. The wood may be in a variety of forms, such as chip, flake, briquette, pellet, and dust form.

Wood smoke may be generated by combusting wood, such as wood chips, in a combustion chamber of a smoking device. The generated smoke is then conveyed from the combustion chamber to a smoking chamber. The raw egg contained in the smoking chamber is exposed to the smoke, resulting in the egg becoming flavoured by the smoke.

A variety of different woods may be used to generate wood smoke. Different woods may impart different flavours or aromas to the raw egg. Suitable woods may include, but are not limited to alder, almond, apple, apricot, ash, birch, cherry, chestnut, hickory, lemon, maple, mesquite, mulberry, nectarine, oak, olive, orange, peach, pear, pecan, plum, walnut, and mixtures thereof. An exemplary wood is hickory.

A suitable amount of wood can be combusted to obtain a desired smoke flavour. There is no particular requirement on the quantity of wood to be combusted and a skilled person would understand that the combustion of a larger quantity of wood could produce a greater volume of smoke that would thus impart stronger flavour to a defined quantity of raw egg.

In one set of embodiments, when wood chips are used as the fuel to provide the smoke for the cold smoking step, the quantity of wood chips is selected such that the mass of raw egg (in grams) to the mass of wood chip (in grams) is in a ratio of from about 2:1 to about 120:1. The ratio of raw egg mass (in grams) to wood chip mass (in grams) may be adjusted to suit the type of wood selected to provide the smoke as well as the desired intensity of smoke flavour.

It may also be desirable for the fuel (e.g. wood) to be combusted slowly when generating the smoke. It is believed that slowly combusted wood may smoulder, to produce a thick, visible smoke that remains cold (i.e. it does not retain residual heat from the combustion) and which has less soot than rapidly combusted wood. Smoke generated from slowly combusted wood may also be more dense and retain some atmospheric water vapour. The smoke generated from slowly combusted wood may also be known as "cold smoke". It can desirable for the process of the invention to utilise a cold smoke during the smoking step.

The cold smoking step of the process of the invention is performed under conditions that are sufficient to impart smoke flavour without cooking the raw egg. The conditions under which the cold smoking step is performed also do not result in freezing of the raw egg. Thus the conditions produce no discernible alternation in the structure or texture of the smoked raw egg.

Cold smoking is generally performed without heat. It can be important to avoid heat during cold smoking as heat can result in cooking and/or dehydration of the raw egg, leading to a change in the physical properties of the raw egg. It is important that smoked raw egg prepared in accordance with the process described herein substantially retains the normal properties and usability of conventional raw egg.

In one set of embodiments, cold smoking is performed at a temperature of no more than about 25° C., no more than about 20° C., or no more than about 15° C. In one embodiment, cold smoking is performed at a temperature of about 20° C. A temperature of about 20° C. can be approximately ambient room temperature.

In a particular form of the process, the cold smoking step is performed under refrigerated conditions, the conditions being sufficient to impart smoke flavour without cooking the raw egg.

In one set of embodiments, the cold smoking step involves exposing the raw egg to smoke while at a temperature of no more than about 10° C., no more than about 7° C., or no more than about 5° C. In particular embodiments, the cold smoking is performed at a temperature in the range of from about 2° C. to 10° C., or from about 2° C. to 5° C.

The refrigerated conditions are sufficient to cool the raw egg to a desired temperature, but not so cool as to cause freezing of the raw egg yolk and/or egg white. Cold smoking under refrigerated conditions may be preferred for compliance with acceptable safety standards for commercial food production.

As discussed above, the process described herein can be performed in a smoking device that comprises a smoking chamber for smoking raw egg contained therein, and a combustion chamber for generating smoke to flavour the raw egg.

The smoking chamber and combustion chamber of a smoking device can be separated from one another. The smoke that is produced in the combustion chamber can be conveyed via a conduit, such as a length of hose or pipe, to the smoking chamber.

To help ensure that smoke being introduced into the smoking chamber is at a desired temperature useful for cold smoking and does not cook the raw egg, it can be helpful to increase the distance by which the smoking chamber and the combustion chamber are separated. This may be achieved by increasing the length of the conduit (for example, the length of the hose or pipe) separating the smoking and combustion chambers. By increasing the separation distance between the smoking chamber and combustion chamber, the smoke that is generated in the combustion chamber can be cooled as it is conveyed along the conduit and thus be at the required temperature as it enters the smoking chamber.

The smoke produced in the combustion chamber may be pumped or blown to the smoking chamber and may be cooled during the pumping or blowing process.

The smoking chamber may also be of a large internal volume and the smoke may be further cooled as it enters the smoking chamber.

If desired, the temperature at which the cold smoking step is performed may be monitored by a thermometer or other temperature sensor or probe in the smoking chamber.

In one set of embodiments, the process described herein is performed in a refrigerated smoking chamber that is maintained at a desired temperature through appropriate temperature controls. For instance, the refrigerated smoking chamber may be maintained at a temperature that is no more than about 10° C., preferably a temperature in the range of from about 2° C. to 10° C., more preferably a temperature in the range of from about 2° C. to 5° C.

The cold smoking step may be carried out for a length of time that is sufficient to impart a desired smoke flavour to the raw egg. For instance, cold smoking may be carried out under a time period ranging from several minutes and up to several hours or even days. A skilled person would understand that the time period may be adjusted to suit parameters such as the temperature selected for performance of the cold smoking step, the quantity of raw egg to be smoked, the amount of smoke that the raw egg is exposed to, the volume of the smoking chamber and/or the intensity of smoke flavour required. For example, more time may be required to achieve a desired flavour if cold smoking is performed at a lower temperature, or if the raw egg is smoked while contained in the egg shell. Additionally, less time may be required to achieve a desired smoke flavour for a smaller quantity or volume of raw egg, if a smoking chamber of smaller volume is used and/or if a given volume of raw egg is thinly spread over a large surface area for exposure to the smoke.

In one set of embodiments, the raw egg is liquid raw egg that is unshelled. In such embodiments, cold smoking of the raw egg may be performed for a time period of at least 30 minutes, or at least 1 hour, in order to impart a smoke flavour to the egg.

In some embodiments, cold smoking of the raw egg is performed at a temperature of no more than 20° C. for a time period selected from the group consisting of at least 1 hour, from about 1 to 6 hours, from about 1 to 2 hours, or about 70 minutes.

In one embodiment of the process described herein, cold smoking of the raw egg is performed at a temperature of no more than 20° C. for about 70 minutes. These conditions may be particularly suitable for cold smoking raw in a smoking device such as the Rational® Combi steamer.

In one set of embodiments, the raw egg is liquid raw egg that is unshelled and which is cold smoked under refrigerated conditions. In such embodiments, the liquid raw egg may be exposed to smoke while at a temperature of no more than about 10° C., for a time period selected from the group consisting of at least 30 minutes, or at least 1 hour, in order to flavour the raw egg. In one preference, the liquid raw egg is exposed to smoke while at a temperature of no more than about 7° C., preferably at a temperature in a range of from about 2° C. to 5° C., during the cold smoking step.

In one set of embodiments, liquid raw egg coats a surface that is in the smoking chamber. In this manner, the volume of liquid raw egg forms a thin film that is spread over a larger surface area, thereby enhancing contact of the liquid raw egg with the smoke in the chamber. This can help to reduce the time required to infuse the liquid raw egg with a desired amount of smoke flavour and thus lead to a shorter or more efficient cold smoking process.

In some embodiments, liquid raw egg that has been cold smoked in accordance with the process described herein may be homogenised (i.e. blended) after the smoking step.

In another set of embodiments, the raw egg is raw shell egg, in which liquid raw egg is contained within an egg shell.

In one aspect, there is provided a process for preparing smoked raw egg contained in an egg shell comprising the step of cold smoking raw shell egg under refrigerated conditions, the conditions being sufficient to impart smoke flavour to the raw egg in the shell without cooking the raw egg.

In one aspect, there is provided a process for preparing smoked raw shell egg comprising the step of exposing raw shell egg to smoke under refrigerated conditions, the conditions being sufficient to impart smoke flavour to raw egg contained in the shell without cooking the raw egg. The refrigerated conditions are also insufficient to freeze the contents of the raw shell egg.

In some embodiments of the process described herein, raw shell egg may be exposed to smoke under refrigerated conditions for a time period selected from at least 1 hour, at least 5 hours, and at least 10 hours, in order to flavour the liquid raw egg in the shell. The time period for cold smoking a raw shell egg may be greater compared to unshelled (i.e. liquid) raw egg as more time can be required for the smoke to permeate the egg shell to flavour the raw egg contained within the shell.

In a specific embodiment, raw shell egg is exposed to smoke while at a temperature of no more than about 10° C., no more than about 7° C., or no more than about 5° C. In a particular embodiment of the process, raw shell egg is exposed to smoke while at a temperature in the range of from about 2° C. to 10° C., or from about 2° C. to 5° C.

The raw shell egg may be exposed to smoke while at a cold temperature (refrigerated) condition for a time period selected from the group consisting of at least 1 hour, at least 5 hours, or at least 10 hours. In some embodiments, the time period may be in a range of from about 1 to 72 hours, from about 10 to 72 hours, or from about 12 to 48 hours. In other embodiments, the time period may be for less than 24 hours (e.g. from 1 to 24 hours), or for about 16 hours.

A skilled person would appreciate that for a selected temperature, the time period for smoking may be adjusted to achieve a desired level of flavour intensity. For instance, a skilled person would understand that an increase in the smoking time at a particular temperature can produce a stronger smoke flavour.

Theoretically there may be no upper limit on the time period for performing the cold smoking process. However, in practice, the upper limit may be restricted by practical considerations such as the desired through-put for the cold smoking process and the intensity of flavour desired.

In one or more embodiments of processes of the invention described herein, cold smoking of the raw egg is performed for a time period not exceeding 72 hours, 64 hours, 48 hours, 24 hours, 16 hours, or 12 hours.

In a particular embodiment, cold smoked raw shell egg may be prepared by exposing raw shell egg to smoke while at a temperature in a range of from about 2° C. to about 5° C. for a time period selected from the group consisting of from about 1 to 72 hours, from about 12 to 48 hours, for less than 24 hours (e.g. for 1 to 24 hours), or for about 16 hours. The raw shell egg may be exposed to smoke while in a refrigerated smoking chamber of a smoking device.

It is important that the raw egg produced by embodiments of the process described herein is not cooked during the smoking step. Furthermore, when refrigerated conditions are used, it is also important that the raw egg produced by embodiments of the process described herein is not frozen during the cold smoking step. The raw egg after smoking therefore retains the physical properties that it had prior to being subjected to the smoking step as cooking or freezing of the raw egg is avoided. Accordingly, the smoked raw egg remains in liquid form and there is no solidification or coagulation of the raw egg, such as solidification of any part of the raw egg yolk and/or egg white, following the smoking step. Thus the composition and physical properties of the raw egg are not altered by the smoking step, such that the smoked raw egg retains the normal behaviour of raw egg and will perform in the same manner as normal raw egg when used in cooking or other food preparation activities. It is therefore important to avoid solidification or coagulation of the raw egg as this will result in a loss of the ability of the smoked raw egg to be used in the same manner as normal raw egg.

The refrigerated smoking process described herein may be particularly suitable for imparting a desirable smoke flavour to raw shell eggs. Without wishing to be limited by theory, it is believed that smoking under refrigerated conditions may help to enhance smoke penetration through the egg shell to flavour the raw egg contained in the shell. It is believed that enhanced smoke penetration may be assisted by low temperature (i.e. temperature less than 10° C.) promoting the opening of pores in the egg shell, thereby allowing more smoke to penetrate the shell and thus impart a stronger smoke flavour, compared to when cold smoking of raw shell egg is performed at a higher temperature for the same period of time.

It has also been found that cold smoking under refrigerated conditions as described herein may help to extend the shelf life of raw shell eggs. In particular, it is believed that particles contained in the smoke (especially wood smoke) may occlude or block pores present in the egg shell after the raw shell egg has been exposed to the smoke for a period of time. This may occur as the smoke may form a coating that at least partially covers the surface of the shell egg. The blockage of pores can in turn inhibit the ingress of air through the egg shell, thereby slowing or inhibiting the natural ageing process of the egg. In particular, it has been observed that the air sac in a raw shell egg subjected to a cold smoking process under refrigeration conditions has not significantly enlarged over time, indicating that the ingress of air into the egg shell has been inhibited. Raw shell egg subjected to cold smoking under refrigerated conditions as described herein may be stored for several weeks without significant deterioration in the quality or physical characteristics of the raw egg that is contained in the shell.

Additionally, the blockage of pores in the egg shell may aid in the retention of the smoke flavour that is imparted to the liquid raw egg contained in the egg shell by the refrigerated cold smoking process described herein.

It has further been found that raw shell egg subjected to cold smoking under refrigerated conditions as described herein can exhibit a reduction in microorganism contamination, in particular, bacterial contamination, compared to raw shell egg not subjected to the refrigerated cold smoking process. Without wishing to be limited by theory, it is believed that the combination of refrigerated conditions and prolonged exposure of raw shell egg to smoke may contribute to a reduction in microorganism contamination. In particular, it is believed that low temperature conditions can help to inhibit microorganism growth while particles present in the smoke (especially wood smoke) can lead to the occlusion of pores in the egg shell, which in turn, can help to inhibit microorganism penetration (e.g. bacteria penetration) into the interior of the raw shell egg. The ability to inhibit microorganism contamination, in particular, bacterial contamination, is a significant advantage, especially from a food safety perspective.

Smoked raw shell egg prepared by exposing raw shell egg to smoke while under refrigerated conditions as described herein may exhibit a reduction in Salmonella contamination, in particular, a reduction in Salmonella enteriditis contamination.

Furthermore, cold smoking of liquid raw egg under refrigerated conditions can also advantageously allow a desired smoke flavour to be imparted to the raw egg while inhibiting undesired microbial contamination or growth, in particular, undesirable growth of bacteria such as *Salmonella enteriditis*.

Thus the refrigerated cold smoking process described herein can enable raw egg to be infused with a smoke flavour while ensuring compliance with food safety regulations and standards set by relevant authorities.

Additionally, for liquid raw egg, it is believed that a discernible smoke flavour can be imbued by the raw egg in a shorter period of time when the cold smoking step is performed under refrigerated conditions, compared to at higher temperatures. Thus it may be possible to impart a discernible smoke flavour to liquid raw egg in a time that is as short as 30 minutes by exposing the liquid raw egg to smoke while under refrigerated conditions. If a stronger smoke flavour is desired, the liquid smoke raw egg may be exposed to the smoke for a longer time period when under the refrigerated conditions.

In some embodiments, the raw egg may be pasteurised before or after the cold smoking step. Thus in some embodiments, the process of the invention may further comprise the step of pasteurising the raw egg. Pasteurisation can assist with increasing the longevity and freshness of the raw egg by inhibiting undesired microbial growth. It can therefore help with ensuring that the smoked raw egg complies with food safety requirements.

In one embodiment, the pasteurisation step takes place after the raw egg has been cold smoked. Thus the process of the invention may comprise the steps of cold smoking the raw egg in accordance with embodiments of the process described herein, and pasteurising the cold smoked raw egg.

In another embodiment, the pasteurisation step precedes the cold smoking step. In such embodiments, the process of the invention may comprises the steps of pasteurising a raw egg, and cold smoking the pasteurised raw egg in accordance with embodiments of the process described herein.

Raw egg in both liquid form and shell form may be pasteurised. It will be appreciated that any type of pasteurisation process considered suitable for raw egg may be used. Such pasteurisation processes generally would not alter the physical properties or usability of the raw egg and may be used either before or after the cold smoking step.

In another aspect, the invention provides a smoked raw egg. The smoked raw egg may comprise a raw whole egg, a raw egg white, a raw egg yolk, or mixtures thereof, flavoured with smoke. The smoke flavour is preferably wood smoke. In some embodiments, the smoked raw egg may comprise a raw mixed (i.e. homogenised) whole egg. In another aspect there is provided smoked raw egg prepared by the process of any one of the embodiments described herein.

In another aspect, there is provided smoked raw egg obtained by cold smoking raw egg under conditions sufficient to impart smoke flavour without cooking the raw egg. Suitable conditions for cold smoking are described herein. In some embodiments, suitable cold smoking conditions involve exposing the raw egg to smoke at a temperature of no more about 25° C., no more than about 20° C., or no more than about 15° C., for a selected time period. In some embodiments, the selected time period may be at least 1 hour. In some embodiments, the selected time period may be up to 6 hours. In some embodiments, the selected time period is from about 1 to 6 hours, from about 1 to 2 hours, or about 70 minutes.

In some embodiments, smoked raw egg is obtained by cold smoking raw egg at a temperature of no more than about 20° C. for a time period of at least 1 hour. In one form, smoked raw egg is obtained by cold smoking raw egg at a temperature of no more than about 20° C. for a time period of from about 1 to 6 hours, from about 1 to 2 hours, or about 70 minutes. In some embodiments, such conditions may be useful for preparing cold smoked liquid raw egg.

In another aspect, there is provided smoked raw egg obtained by cold smoking raw egg under refrigerated conditions, the conditions sufficient to impart smoke flavour without cooking the raw egg. Suitable refrigerated conditions for cold smoking are described herein. In some embodiments, suitable cold smoking conditions involve exposing the raw egg to smoke at a temperature of no more than about 10° C., no more than about 7° C. or no more than about 5° C., for a selected time period. It is important that the conditions selected for cold smoking are insufficient to cause freezing of the raw egg, such as freezing of the raw egg yolk and/or egg white.

In some embodiments, the selected time period for cold smoking the raw egg under refrigerated conditions may be at least 30 minutes, at least 1 hour, at least 5 hours, or at least 10 hours. In some embodiments, the selected time period may be up to 72 hours. In some embodiments, the selected time period is from about from about 1 to 72 hours, from 10 to 72 hours, from about 12 to 48 hours, from about 12 to 24 hours, or about 16 hours. Such time periods may be suitable when the cold smoking step is performed at a temperature of no more than about 10° C.

In some embodiments, smoked raw egg is obtained by cold smoking raw egg at a temperature in a range of from about 2° C. to 10° C., or from about 2° C. to about 5° C. for a time period of at least 30 minutes, at least 1 hour, at least 5 hours, or at least 10 hours. In one form, smoked raw egg is obtained by cold smoking raw egg at a temperature in a range of from about 2° C. to about 5° C. for a time period of from about 1 to 72 hours, from about 10 to 72 hours, from about 12 to 48 hours, from about 12 to 24 hours, or about 16 hours.

In one form, smoked raw egg is obtained by cold smoking raw egg at a temperature in a range of from about 2° C. to about 5° C. for a time period of from about 1 to 24 hours. In a particular embodiment, smoked raw egg is obtained by cold smoking raw egg at a temperature in a range of from about 2° C. to about 5° C. for about 16 hours. Such conditions may be particularly suitable for forming cold smoked raw shell egg.

In another particular embodiment, smoked raw egg is obtained by cold smoking raw egg at a temperature in a range of from about 2° C. to about 5° C. for a time period in a range of from about 30 minutes to about 2 hours. Such conditions may be particularly suitable for forming cold smoked liquid (unshelled) raw egg.

The smoked raw egg described herein may have a smoke flavour ranging from a light smoked flavour to a strong smoke flavour, which can be achieved by adjusting parameters such as the cold smoking time period and the quantity of smoke to which the raw egg is exposed to during the cold smoking step.

The smoked raw egg may be used in the same way as conventional raw, uncooked eggs and can be incorporated in a variety of different foodstuffs to impart a smoke flavour to the foodstuff. For example, the smoked raw egg can be used in the preparation of foodstuffs including but not limited to quiches, pies, scrambled eggs, fried eggs, pasta, frittata, tarts, souffles, roulades, ice-cream, gelato, pavlova, macarons and sauces including mayonnaise and aioli.

Since physical properties of the raw egg, such as the normal texture and structure of the raw egg, are not affected by the egg flavouring process described herein, the smoke flavoured raw egg can be used in the same way as normal raw egg. Thus although the flavour of the raw egg has changed, i.e. it has a smoke flavour, it retains the normal binding, beating, whipping properties, etc of conventional raw egg. Accordingly, cooks and chefs may use the smoked raw egg in the same way as normal raw egg in any food preparation process.

In another aspect there is provided a packaged product comprising smoked raw egg enclosed in a package. The smoked raw egg is prepared by embodiments of the egg flavouring process described herein.

If the raw egg is smoked while contained in its shell, the smoked raw egg may be removed from the shell prior to being enclosed in a package to form the packaged product.

The smoked raw egg may be enclosed any suitable package to form the packaged product. For example, the package may by a foil package or a cryovac package.

In some embodiments, smoked raw shell egg may be packaged in egg cartons and the like, for use by consumers as a fresh product.

Suitable packages may facilitate storage of the smoked raw egg at room temperature or at below room temperature.

In some embodiments, the package may facilitate storage of the smoked raw egg at a temperature of about 4° C.

The invention will now be described with reference to the following examples. However, it is to be understood that the examples are provided by way of illustration of the invention and that they are in no way limiting to the scope of the invention.

EXAMPLES

Cold Smoked Liquid Raw Egg

A desired number of raw eggs were cracked to remove the egg contents from the shell, with the contents being placed onto a tray. If the whole egg (unseparated white and yolk) is to be smoked, a desired quantity of unbroken whole egg is placed on the tray. If only egg white or egg yolk is to be smoked, the egg whites and yolks may first be separated from one another then the desired quantity of egg white or egg yolk is placed on the tray. The tray containing the raw egg is then placed into the smoking chamber of a smoking device and cold smoked in the smoking chamber in accordance with the conditions provided below.

Examples 1 to 7: Cold Smoked Liquid Whole Eggs

The Rational® Combi Steamer by Rational AG was used to prepare the smoked liquid raw whole egg (not in shell) in each example. The Rational® Combi Steamer is equipped with a smoker accessory. If desired, the Combi steamer was pre-heated to a selected temperature prior to the raw egg being introduced for smoking. The Combi steamer and smoker accessory was prepared in accordance with instructions provided by Rational® and smoke was introduced into the interior of the Combi steamer prior to the raw egg being placed in the Combi steamer.

A tray containing a mass of raw whole egg (liquid, unmixed) to be smoked is placed into a roll-in trolley rack, then the rack is rolled into the smoke filled Rational® Combi steamer oven and left to be exposed to the smoke for a selected period of time. Each raw whole egg was approximately 50 grams in mass.

| Example | Egg mass (g) | Pre-heat time (min) | Smoker Temp (° C.) | Time in smoker (min) | Qty wood chips (g) | Result |
|---|---|---|---|---|---|---|
| 1 | 1500 (30 whole eggs) | none | 20 | 60 | 200 | Very light smoke flavour |
| 2 | 3000 | none | 20 | 80 | 200 | Light smoke flavour |
| 3 | 1500 | none | 20 | 75 | 200 | Strong smoke flavour |
| 4 | 1500 | none | 20 | 65 | 200 | Light smoke flavour |
| 5 | 1500 | none | 20 | 70 | 200 | Excellent smoke flavour |
| 6 | 1500 | none | 20 | 72 | 220 | Strong smoke flavour |
| 7 | 1500 | none | 20 | 70 | 200 | Excellent smoke flavour |

Examples 8 to 14

Cold Smoked Egg Yolks

The Rational® Combi Steamer by Rational AG with smoker attachment containing a desired amount of wood chips was used to prepare the smoked raw egg yolk in each example. The general procedure described in Examples 1 to 7 above was followed to prepare for the cold smoking step.

Raw egg yolks (not in shell) were used, with each raw egg yolk being approximately 18 grams in mass.

| Example | Egg mass (g) | Pre-heat time (min) | Smoker Temp (° C.) | Time in smoker (min) | Qty wood chips (g) | Result |
|---|---|---|---|---|---|---|
| 8 | 540 (30 egg yolks) | none | 20 | 60 | 200 | Very light smoke flavour |
| 9 | 1080 | none | 20 | 80 | 200 | Light smoke flavour |
| 10 | 540 | none | 20 | 75 | 200 | Strong smoke flavour |
| 11 | 540 | none | 20 | 65 | 200 | Light smoke flavour |
| 12 | 540 | none | 20 | 70 | 200 | Excellent smoke flavour |
| 13 | 540 | none | 20 | 72 | 220 | Very strong smoke flavour |
| 14 | 540 | none | 20 | 70 | 200 | Excellent smoke flavour |

Examples 15 to 21

Cold Smoked Egg Whites

The Rational® Combi Steamer by Rational AG with smoker attachment containing a desired amount of wood chips was used to prepare the smoked raw egg white in each example. The general procedure described in Examples 1 to 7 above was followed to prepare for the cold smoking step.

Raw egg whites (not in shell) were used, with each raw egg white being approximately 33 grams in mass.

| Example | Egg mass (g) | Pre-heat time (min) | Smoker Temp (° C.) | Time in smoker (min) | Qty wood chips (g) | Result |
|---|---|---|---|---|---|---|
| 15 | 990 (30 egg whites) | none | 20 | 60 | 200 | Very light smoke flavour |
| 16 | 1980 | none | 20 | 80 | 200 | Light smoke flavour |
| 17 | 990 | none | 20 | 75 | 200 | Strong smoke flavour |
| 18 | 990 | none | 20 | 65 | 200 | Light smoke flavour |
| 19 | 990 | none | 20 | 70 | 200 | Excellent smoke flavour |
| 20 | 990 | none | 20 | 72 | 220 | Very strong smoke flavour |
| 21 | 990 | none | 20 | 70 | 200 | Excellent smoke flavour |

Example 22

Cold Smoked Liquid Whole Egg

The Bradley™ smoker containing a desired amount of wood chips was used to prepare the smoked liquid raw whole egg. The combustion chamber of the smoker was separated from the smoking chamber by a passage of approximately 135 cm in length to enable the generated smoke to cool prior to reaching the smoking chamber.

Raw whole eggs (not in shell) were used, with the mass of each raw whole egg being approximately 50 grams.

| Example | Egg mass (g) | Pre-heat time (min) | Smoker Temp (° C.) | Time in smoker (min) | Qty wood chips (g) | Result |
|---|---|---|---|---|---|---|
| 22 | 1500 (30 whole eggs) | none | Approx. 20° C. | 5 | 200 | Good smoke flavour |

Comparative Examples 1 to 3

The Rational® Combi Steamer by Rational AG with smoker attachment containing a desired amount of wood chips was used to prepare the smoked raw egg in each Comparative Example (CE). The general procedure described in Examples 1 to 7 above was followed to prepare for the smoking step.

The following smoking conditions were found to be unsuitable as they resulted in some solidification of the raw egg.

| Example | Egg mass (g) | Pre-heat time (min) | Smoker Temp (° C.) | Time in smoker (min) | Qty wood chips (g) | Result |
|---|---|---|---|---|---|---|
| CE1 | 1500 (30 whole eggs) | 5 min | 30 | 60 | 200 | Slightly cooked egg |
| CE2 | 540 (30 egg yolks) | 5 min | 30 | 60 | 200 | Slightly cooked egg yolks (hard cover on yolks) |
| CE3 | 990 (30 egg whites) | 5 min | 30 | 60 | 200 | Slightly cooked egg white (white film formed on top) |

Example 23

Raw Shell Eggs Cold Smoked Under Refrigerated Conditions

A desired number of raw shell eggs (120 eggs) were washed and graded within a few hours of being collected. Washed grade 1 raw shell eggs were placed on a plastic trays (4 trays, each with 30 eggs) that holds the eggs. The plastic trays with the raw shell eggs were then placed on a trolley. The trolley was then wheeled into a temperature controlled refrigerated unit adapted to function as a refrigerated smoking chamber. The refrigerated chamber has a capacity for 22,016 raw shell eggs (4 trolleys holding 5504 shell eggs per trolley). Once the raw shell eggs were placed in the chamber, the door of the chamber was closed and sealed.

The refrigerated chamber is connected to a combustion chamber that produces wood smoke. A desired quantity of wood chips were placed in the combustion chamber and set alight so as to combust. The smoke generated from the combustion of the wood chips was conveyed to the refrigerated smoking chamber through a length of hose by a pump.

Trays containing the raw shell egg in the refrigerated smoking chamber were then exposed to the wood smoke in accordance with the conditions provided below.

| Example | Pre-heat time (min) | Smoking chamber Temp (° C.) | Time in smoking chamber (hours) | Qty wood chips (g) | Result |
|---|---|---|---|---|---|
| 23 | none | 2 to 5 | 16 | 200 | Excellent smoke flavour |

The shelf-life of the cold smoked raw shell egg prepared in accordance with Example 23 was assessed by allowing several smoked raw shell eggs to be stored at ambient environmental conditions (room temperature of approximately 21° C.) for 8 weeks. After the 8 week storage period had elapsed, it was observed that the air sac of the smoked raw shell eggs had not become enlarged, indicating that the freshness of the raw egg had been preserved. Additionally, after the smoked raw shell egg had been cracked open, the whole raw egg that had been contained in the shell was observed to be similar in appearance to that of normal fresh raw egg that has not been stored. For example, the albumin (egg white) from the smoked raw shell egg was observed to be relatively firm in appearance, and not runny in consistency, which might otherwise be seen in an aged shell egg where proteins in the egg white have broken down or deteriorated. Furthermore, the whole raw egg extracted from the shell of the smoked shell egg was able to be incorporated into a food product in the same way as normal raw egg and imparted a pleasing smoke flavour to the food product.

Cold smoked raw shell egg prepared in accordance with Example 23 was also tested for bacterial contamination during the 8 week storage period. A comparative raw shell egg, which has not been treated with the cold smoking process, was also tested. The tests were performed by Symbio Laboratories Pty Ltd in Australia. The results are shown in Tables 1 and 2. The results show that the penetration of bacteria into the smoked raw shell egg was inhibited over the storage time period.

TABLE 1

Bacterial contamination in comparative normal raw egg (not cold smoked)

| Sample Description | Aerobic Plate Count (cfu/g) | Salmonella (/25 g) |
|---|---|---|
| Plain eggs - initial test | <100 | ND |
| Plain eggs - week 2 | <10 | ND |
| Plain eggs - week 3 | <10 | ND |
| Plain eggs - week 5 | 1,200,000 | — |
| Plain eggs - week 8 | 7,900,000 | — |
| | M2.5 AOAC 990.12 | AM11.30.A AFNOR BIO 12/16-09/05 |

TABLE 2

Bacterial contamination in cold smoked raw shell egg

| Sample Description | Aerobic Plate Count (cfu/g) | Salmonella (/25 g) |
|---|---|---|
| Smoked eggs - initial test | <100 | ND |
| Smoked eggs - week 2 | <10 | ND |
| Smoked eggs - week 3 | <10 | ND |
| Smoked eggs - week 5 | <10 | — |
| Smoked eggs - week 8 | <10 | — |
| | M2.5 AOAC 990.12 | AM11.30.A AFNOR BIO 12/16-09/05 |

Examples 24 to 30

Raw Shell Eggs Cold Smoked Under Refrigerated Conditions for Varying Time Periods Washed and graded raw shell eggs were placed into plastic trays and then placed on a trolley. The trolley was wheeled into a temperature controlled refrigerated unit adapted to function as a refrigerated smoking chamber. The smoking chamber was at a temperature of 2 to 5° C. before the raw shell eggs were introduced. Once the raw shell eggs were placed in the chamber, the door of the chamber was closed and sealed.

The refrigerated chamber is connected to a combustion chamber that produces wood smoke. A quantity of wood chips (200 g) were placed in the combustion chamber and set alight so as to combust. The smoke generated from the combustion of the wood chips was conveyed to the refrigerated smoking chamber through a length of hose by a pump.

The raw shell eggs in the refrigerated smoking chamber were then exposed to the wood smoke. After various time periods had elapsed, a number of raw shell eggs were removed from the smoking chamber. The smoked raw shell eggs were then cracked open to extract the contents of the shell. The smoked unshelled raw egg was then assessed for appearance compared to normal raw egg. The smoked raw egg following removal from the shell was also assessed to determine if any smoke smell was detectable. The smoked raw egg was then microwaved to cook the egg and to assess the smoke flavour of the cooked egg.

The results are shown below:

| Example | Time in smoking chamber (hours) | Assessment of smoked raw egg | Flavour of cooked smoked egg |
|---|---|---|---|
| 24 | 10 | No change in appearance No detectable smoke smell | Light smoke flavour |
| 25 | 15 | Egg white has slight yellow tinge Slight smoke smell | Distinctive smoke flavour |
| 26 | 20 | Egg white has yellow tinge Slightly stronger smoke smell | Distinctive smoke flavour |
| 27 | 25 | Egg white has slightly darker yellow tinge Strong smoke smell | Pleasant smoke flavour with good after taste |
| 28 | 30 | Smoke tinged egg white and egg yolk Reasonably strong smoke smell | Strong smoke flavour |
| 29 | 35 | Smoke tinged egg white and egg yolk Reasonably strong smoke smell | Strong smoke flavour with strong after taste |

| Example | Time in smoking chamber (hours) | Assessment of smoked raw egg | Flavour of cooked smoked egg |
|---|---|---|---|
| 30 | 40 | Definite smoke tinge to egg yolk and darker yellow tinge to egg white | Very strong smoke flavour and after taste |

In each of the above examples, the smoke was able penetrate the egg shell as evidenced by a brown stain being observed on the interior surface of the egg shell when the smoked shell egg was cracked open. In addition, in each of the above examples, the exterior surface of the egg shell was at least partially covered with a brown coating.

After cracking open the smoked raw shell eggs, it was observed that the resulting smoked raw egg retained the structure and texture of normal raw egg, even after being exposed to smoke for up to 40 hours. The only change evident was a change to the colour of the raw egg, with the egg white becoming tinged with yellow, with the yellow-ish colour becoming more evident as the raw egg was exposed for longer periods to the smoke. The yellow-ish tinge to the transparent egg white indicated that the smoke has reached the raw egg and was not unappealing. The smoked raw egg could be cooked like normal raw egg to produce a smoke flavoured cooked egg product.

Example 31

Raw Shell Eggs Cold Smoked Under Refrigerated Conditions

A desired number of raw shell eggs (3600 eggs) were washed and graded within a few hours of being collected. Washed grade 1 raw shell eggs were placed on a plastic trays that hold the eggs. The plastic trays with the raw shell eggs were then placed on a trolley. The trolley was then wheeled into a temperature controlled refrigerated unit adapted to function as a refrigerated smoking chamber. The refrigerated chamber has a capacity for 22,016 raw shell eggs (4 trolleys holding 5504 shell eggs per trolley). Once the raw shell eggs were placed in the chamber, the door of the chamber was closed and sealed.

The refrigerated chamber is connected to a combustion chamber that produces wood smoke. A desired quantity of wood chips were placed in the combustion chamber and set alight so as to combust. The smoke generated from the combustion of the wood chips was conveyed to the refrigerated smoking chamber through a length of hose by a pump.

Trays containing the raw shell egg in the refrigerated smoking chamber were then exposed to the wood smoke in accordance with the conditions provided below.

| Example | Pre-heat time (min) | Smoking chamber Temp (° C.) | Time in smoking chamber (hours) | Qty wood chips (g) | Result |
|---|---|---|---|---|---|
| 31 | none | 2 to 5 | 48 | 200 | Excellent smoke flavour |

Example 32

Liquid Raw Egg Cold Smoked Under Refrigerated Conditions

A volume of liquid raw egg (4 litres) were placed in a tray and then placed in a refrigerated chamber. The door of the chamber was closed and sealed.

The refrigerated chamber is connected to a combustion chamber that produces wood smoke. A desired quantity of wood chips were placed in the combustion chamber and set alight so as to combust. The smoke generated from the combustion of the wood chips was conveyed to the refrigerated smoking chamber through a length of hose.

The liquid raw egg in the refrigerated smoking chamber was exposed to the wood smoke in accordance with the conditions provided below. It was found that less time was needed to achieve a pleasing smoke flavour when the temperature was at 2 to 5° C.

| Example | Pre-heat time (min) | Smoking chamber Temp (° C.) | Time in smoking chamber (hour) | Qty wood chips (g) | Result |
|---|---|---|---|---|---|
| 32 | none | 2 to 5 | 1 | 200 | Excellent smoke flavour |

Example 33

Raw Shell Eggs Smoked at Ambient Temperature

Washed and graded raw shell eggs were placed into plastic trays and then placed on a trolley. The trolley was wheeled into a smoking chamber that was at ambient room temperature (approximately 15 to 20° C.). The door of the chamber was then closed and sealed. The temperature in the smoking chamber was monitored periodically with a thermometer during the smoking process.

A quantity of wood chips (200 g) were placed in the combustion chamber and set alight so as to combust. The smoke generated from the combustion of the wood chips was conveyed to the smoking chamber through a length of hose by a pump.

The raw shell eggs in the smoking chamber were exposed to the wood smoke. The raw shell eggs were removed from the smoking chamber after a time of 84 hours had elapsed and were visually inspected. It was found that the exterior surface of the shell was not stained or covered with a brown coating even after being exposed to the smoke for a lengthy period of time.

The smoked raw shell egg was then cracked open and the raw egg contents assessed. It was found that the smoked raw egg (unshelled) had not changed in appearance and there was no discernible smoke smell. The smoked raw egg was then cooked by poaching the egg. The poached egg had a very light smoke flavour.

It is to be understood that various other modifications and/or alterations may be made without departing from the spirit of the present invention as outlined herein.

The invention claimed is:

1. A process for preparing smoked raw avian egg, said process comprising cold smoking raw avian egg, said cold smoking comprising exposing the raw avian egg to smoke at a temperature of no more than about 10° C., said cold smoking being sufficient to impart smoke flavour without cooking the raw avian egg.

2. A process according to claim 1, wherein the temperature at which cold smoking is performed is no more than about 5° C.

3. A process according to claim 1, wherein the cold smoking is performed for a time period of at least 30 minutes.

4. A process according to claim 1, wherein the cold smoking is performed for a time period of at least 1 hour.

5. A process according to claim 1, wherein the cold smoking is performed for a time period of at least 10 hours.

6. A process according to claim 1, wherein the cold smoking is performed for a time period of from about 12 to 48 hours.

7. A process according to claim 1, wherein the cold smoking is performed for a time period in a range of from about 1 to 72 hours, and the temperature at which said cold smoking is performed is in a range of from about 2 to 5° C.

8. A process according to claim 1, wherein the cold smoking is performed for a time period of about 16 hours, and the temperature at which said cold smoking is performed is in a range of from about 2 to 5° C.

9. A process according to claim 1, wherein the raw avian egg is in liquid form.

10. A process according to claim 1, wherein the raw avian egg is raw shell egg.

11. A process according to claim 10, wherein said cold smoking further comprises the smoke forming a coating that at least partially covers the raw shell egg.

12. A process according to claim 1, wherein said cold smoking is sufficient to change the colour of the raw avian egg.

13. A process according to claim 1, wherein said cold smoking is sufficient to impart a smoke smell to the raw avian egg.

14. A process according to claim 1, wherein said smoke is unfiltered.

15. A process according to claim 1, wherein said cold smoking is performed for a time period of up to 6 hours.

16. A process for preparing smoked raw avian egg contained in an egg shell, said process comprising cold smoking raw avian egg contained in the egg shell, said cold smoking comprising refrigerating the raw avian egg contained in the egg shell while exposing the raw avian egg contained in the egg, shell to smoke at a temperature of no more than about 10° C. said cold smoking being sufficient to impart smoke flavour to the raw avian egg contained in the egg shell without cooking said raw avian egg.

17. A process according to claim 16, wherein the cold smoking is performed at a temperature of no more than about 5° C.

18. A process according to claim 16, wherein said cold smoking is sufficient to change the colour of the raw avian egg contained in the egg shell.

19. A process according to claim 16, wherein said cold smoking is sufficient to impart a smoke smell to the raw avian egg contained in the egg shell.

20. A process according to claim 16, wherein said smoke is unfiltered.

21. A process according to claim 16, wherein said cold smoking is performed for a time period of up to 6 hours.

22. A process according to claim 16, wherein said cold smoking further comprises the smoke forming a coating that at least partially covers the raw avian egg contained in the egg shell.

* * * * *